(12) United States Patent
Yamamoto

(10) Patent No.: US 11,297,206 B2
(45) Date of Patent: Apr. 5, 2022

(54) COLOR PREDICTION MODEL CREATION USING A FIRST MODEL TO CREATE A SECOND MODEL

(71) Applicant: SEIKO EPSON CORPORATION, Tokyo (JP)

(72) Inventor: Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/202,479

(22) Filed: Mar. 16, 2021

(65) Prior Publication Data

US 2021/0297557 A1 Sep. 23, 2021

(30) Foreign Application Priority Data

Mar. 18, 2020 (JP) .............................. JP2020-048147

(51) Int. Cl.
*H04N 1/60* (2006.01)
*B41J 2/21* (2006.01)

(52) U.S. Cl.
CPC .......... *H04N 1/6019* (2013.01); *B41J 2/2132* (2013.01); *H04N 1/605* (2013.01); *H04N 1/6008* (2013.01)

(58) Field of Classification Search
CPC .... H04N 1/6019; H04N 1/6008; H04N 1/605; B41J 2/2132
See application file for complete search history.

(56) References Cited

U.S. PATENT DOCUMENTS

| 2009/0086225 A1* | 4/2009 | Fan ...................... H04N 1/6019 358/1.9 |
| 2013/0155468 A1* | 6/2013 | Ukishima ................ H04N 1/52 358/3.23 |

FOREIGN PATENT DOCUMENTS

JP 2012-249182 A 12/2012

\* cited by examiner

*Primary Examiner* — Christopher Wait
(74) *Attorney, Agent, or Firm* — Global IP Counselors, LLP

(57) ABSTRACT

A color prediction model creation device configured to create a color prediction model for predicting color values of a device-independent color system from an ink amount set includes: a first color prediction model creation unit configured to acquire a first spectral reflectance of a color chart printed on a first printing medium by using a first ink amount set, and create a first color prediction model for the first printing medium by learning a correspondence relationship between the first ink amount set and the first spectral reflectance; and a second color prediction model creation unit configured to acquire a second spectral reflectance of a color chart printed on a second printing medium by using a second ink amount set having a smaller number of combinations than that of the first ink amount set, and create a second color prediction model for the second printing medium by learning using the second ink amount set, the second spectral reflectance and the first color prediction model.

8 Claims, 7 Drawing Sheets

COLOR PREDICTION MODEL CREATION USING A FIRST MODEL TO CREATE A SECOND MODEL

The present application is based on, and claims priority from JP Application Serial Number 2020-048147, filed Mar. 18, 2020, the disclosure of which is hereby incorporated by reference herein in its entirety.

BACKGROUND

1. Technical Field

The present disclosure relates to a technique for creating a color prediction model.

2. Related Art

In a printing device, a color conversion processing is performed in which color values of input image data represented by a first color system are converted into color values of a second color system corresponding to types of ink. In the color conversion processing, a plurality of color conversion tables for associating the color values of the first color system with the color values of the second color system are referred to. Such a color conversion table may be created by using a color prediction model for predicting a spectral reflectance at any ink amount set based on a spectral reflectance of a color chart printed with a typical ink amount set among all colors that can be printed by the printing device. For example, JP-A-2012-249182 discloses a technique of creating a color prediction model by learning a relationship between an ink amount set and a spectral reflectance of a color chart printed with such an ink amount set using a neural network.

If the number of ink colors used in a printing device increases, the number of combinations of ink amount sets is enormous, and time and effort required for printing a color chart and measuring colors increase. In a sublimation transfer printing device that prints on a medium such as a fabric product, after printing on a transfer paper, there are operations such as transfer to a fabric and drying of the fabric, and therefore time and effort to obtain a printed matter is further increased. In addition, color measurement data may not be accurately acquired due to a texture of the fabric, a tension applied to the fabric at a time of color measurement, and the like. Therefore, there is a demand for a technique capable of creating a more accurate color prediction model while reducing the time and effort required for printing a color chart on cloth and measuring colors.

SUMMARY

A first aspect of the present disclosure provides a color prediction model creation device configured to create a color prediction model for predicting color values of a device-independent color system from an ink amount set that is combinations of ink amounts for inks used in printing. The color prediction model creation device includes: a first color prediction model creation unit configured to acquire a first spectral reflectance that is a color measurement value of a color chart printed on a first printing medium by using a predetermined first ink amount set, and create a first color prediction model that is the color prediction model used for the first printing medium by learning a correspondence relationship between the first ink amount set and the first spectral reflectance; and a second color prediction model creation unit configured to acquire a second spectral reflectance that is a color measurement value of a color chart printed on a second printing medium that is different from the first printing medium by using a predetermined second ink amount set having a smaller number of combinations than that of the first ink amount set, and create a second color prediction model that is the color prediction model used for the second printing medium by learning using the second ink amount set, the second spectral reflectance and the first color prediction model.

A second aspect of the present disclosure provides a color prediction model creation system configured to create a color prediction model for predicting color values of a device-independent color system from an ink amount set that is combinations of ink amounts for inks used in printing. The color prediction model creation system includes: a server provided with a storage unit in which a first color prediction model, which is the color prediction model used for a first printing medium, is stored; and a client configured to input a spectral reflectance that is a color measurement value of the color chart printed on a second printing medium, which is different from the first printing medium, by using a predetermined ink amount set. The color prediction model creation system is configured to create a second color prediction model that is the color prediction model used for the second printing medium by learning using the ink amount set, the spectral reflectance, and the first color prediction model.

A third aspect of the present disclosure provides a color prediction model creation method for creating a color prediction model for predicting color values of a device-independent color system from an ink amount set that is combinations of ink amounts for inks used in printing. The color prediction model creation method includes: a first model creation step of acquiring a first spectral reflectance that is a color measurement value of a color chart printed on a first printing medium by using a predetermined first ink amount set, and creating a first color prediction model that is the color prediction model used for the first printing medium by learning a correspondence relationship between the first ink amount set and the first spectral reflectance; and a second model creation step of acquiring a second spectral reflectance that is a color measurement value of a color chart printed on a second printing medium that is different from the first printing medium by using a predetermined second ink amount set having a smaller number of combinations than that of the first ink amount set, and creating a second color prediction model that is the color prediction model used for the second printing medium by learning using the second ink amount set, the second spectral reflectance and the first color prediction model.

DESCRIPTION OF EXEMPLARY EMBODIMENTS

A1. First Embodiment

Figure 1:
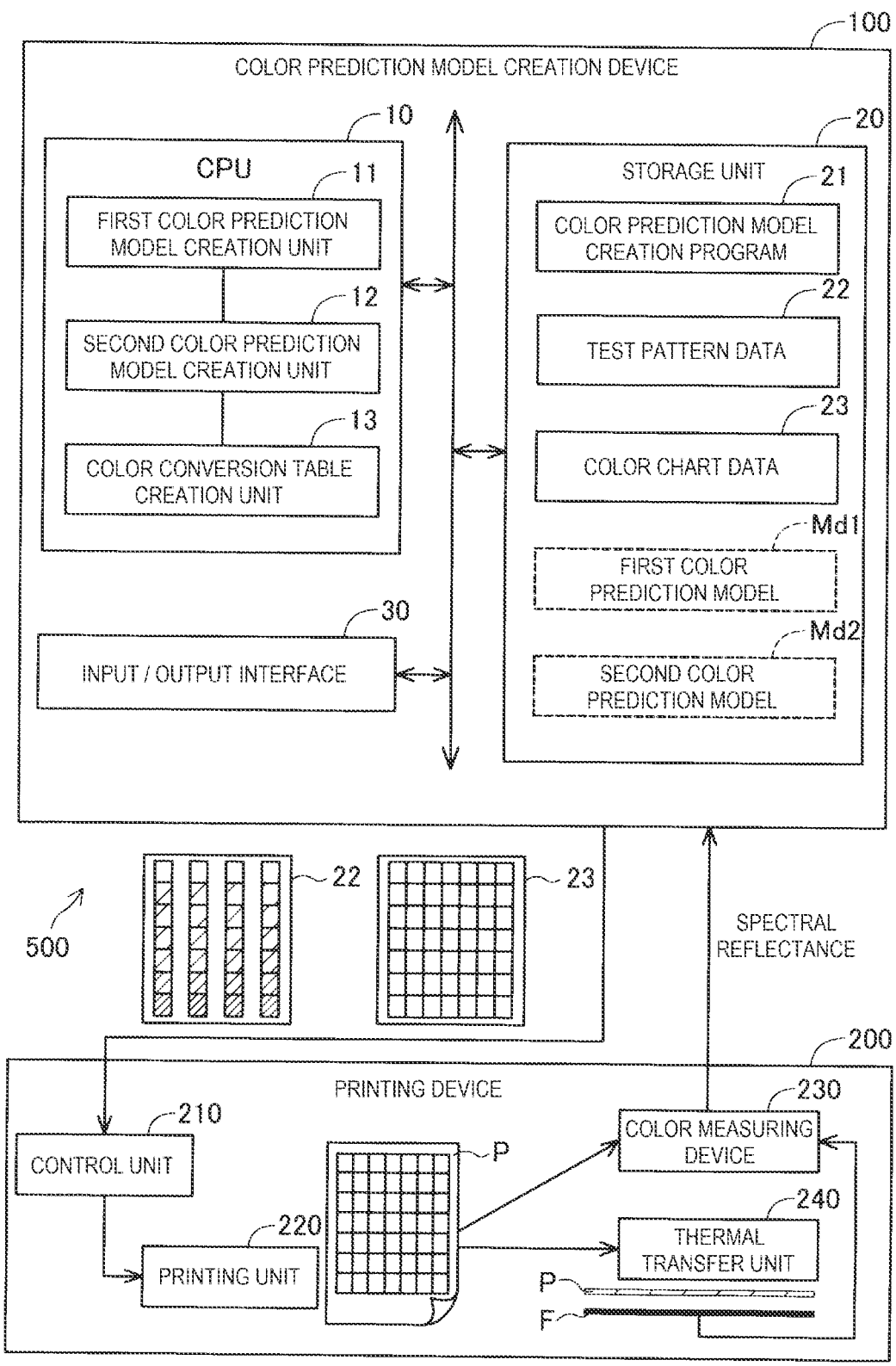
FIG. 1 is a block diagram showing a schematic configuration of a color prediction model creation system according to an embodiment of the present disclosure.

FIG. 1 is a block diagram showing a schematic configuration of a color prediction model creation system 500 according to an embodiment of the present disclosure. The color prediction model creation system 500 includes a color prediction model creation device 100 according to an embodiment of the present disclosure, and a printing device 200 that actually prints an image under the control of the color prediction model creation device 100.

The printing device 200 is a sublimation transfer type inkjet printer. The printing device 200 forms dots on a first printing medium P by ejecting inks of four colors including cyan, magenta, yellow, and black inks to the first printing medium P, so as to print an image. In the present embodiment, the first printing medium P is a plain paper or a transfer paper. The printing device 200 thermally transfers the image printed on the first printing medium P to a second printing medium F by sublimation transfer. In the present embodiment, the second printing medium F is a cloth such as cotton cloth and polyester cloth. The printing device 200 includes a control unit 210, a printing unit 220, a color measuring device 230, and a thermal transfer unit 240.

The control unit 210 is configured with a microcomputer including a CPU and a storage unit, and controls an entire printing device 200. When the control unit 210 receives image data to be printed from the color prediction model creation device 100, the control unit 210 controls the printing unit 220 to form a printed image on the first print medium P. When the printing on the first print medium P is completed, the control unit 210 controls transfer of the printed image to the second print medium F by the thermal transfer unit 240. When the control unit 210 receives an instruction from the color prediction model creation device 100 to execute color measurement of the printed images formed on the printing media P and F, the control unit 210 controls the color measurement of the first printing medium P or the second printing medium F by the color measuring device 230.

The printing unit 220 includes a printing head, and ejects ink droplets to the first printing medium P in response to a control signal from the control unit 210 to print an image.

The color measuring device 230 measures a spectral reflectance R(λ) of an image printed on the first printing medium P and the second printing medium F, that is, a group of dots formed on the first printing medium P and the second printing medium F. The color measuring device 230 may not be provided in the printing device 200. In this case, the color prediction model creation device 100 may control another reading device such as a spectrocolorimeter or a scanner to acquire the spectral reflectance of the printed image.

The thermal transfer unit 240 sublimation transfers the printed matter printed on the first print medium P to the second print medium F in response to the control signal from the control unit 210. The thermal transfer unit 240 transfers, in a state where the first printing medium P and the second printing medium F are overlapped with each other, the printed matter on the first print medium P onto the second print medium F by applying heat and pressure based on a heating temperature and a heating time set in the control unit 210.

The color prediction model creation device 100 creates a color prediction model for predicting color values based on ink amounts. In the present embodiment, the "color prediction model" is a table for predicting the spectral reflectance when printing is performed with an ink amount set that is any combination of ink amounts of inks in the printing device 200. The color prediction model is referred to when creating a color conversion table for converting color values of a device-independent color system into color values of a CMYK color system depending on the printing device 200. The color prediction model creation device 100 actually prints a color chart for a plurality of representative points in an ink amount space of the inks of the printing device 200, acquires the spectral reflectance from the color measuring device 230, and learns by a neural network to create the color prediction model by using the obtained spectral reflectance. The spectral reflectance may be acquired by input from an input/output interface 30 of the color prediction model creation device 100.

The color prediction model creating device 100 is a computer including a CPU 10, a storage unit 20, and the input/output interface 30. The CPU 10, the storage unit 20, and the input/output interface 30 are bidirectionally communicable connected via an internal bus. The CPU 10 functions as a first color prediction model creation unit 11, a second color prediction model creation unit 12, and a color conversion table creation unit 13 by executing a control program stored in the storage unit 20 in advance.

The first color prediction model creation unit 11 creates a color prediction model Md1 used for the first printing medium P. The second color prediction model creation unit 12 creates a color prediction model Md2 used for the second printing medium F. The second color prediction model creation unit 12 creates the color prediction model Md2 used for the second printing medium F by learning using the color prediction model Md1 used for the first print medium. The creation method of the color prediction models will be described later. In the following description, the color prediction model Md1 used for the first printing medium P will be referred to as a "first color prediction model" Md1, and the color prediction model Md2 used for the second print medium F will be referred to as a "second color prediction model" Md2.

The color conversion table creation unit 13 uses the second color prediction model Md2 to create a color conversion table in which color values of a device-dependent color system and the color values of the device-independent color system are associated. In the present embodiment, the CMYK color system is used as the device-dependent color system, and a CIE-Lab color system is used as the device-independent color system. Therefore, the color conversion table defines a correspondence relationship between CMYK values and Lab values. The device-independent color system may be any other device-independent color system such as XYZ and CIE-Luv instead of the CIE-Lab color system. In the color conversion table, a correspondence relationship between RGB values and the Lab values and a correspondence relationship between the CMYK values and XYZ values may be defined.

The storage unit 20 includes a ROM, a RAM, and an EEPROM. In the storage unit 20, in addition to the control program that achieves functions of the above-mentioned functional units, a color prediction model creation program 21, color chart data 23, and test pattern data 22 are stored in advance.

The color prediction model creation program 21 is a computer program for creating the first color prediction model Md1 and the second color prediction model Md2. In accordance with execution of the color prediction model creation program 21, the color prediction model creation processing described later is executed. The first color prediction model Md1 and the second color prediction model Md2 are generated by executing the color prediction model creation processing, and thus are represented by broken lines in FIG. 1.

The color chart data 23 is image data of a color chart represented by the ink amount set displayed by the ink amounts. The color chart has multiple color patches. Each color patch is associated with ink amounts of ink colors, and is used as a color sample of a mixed color of the ink amounts.

The test pattern data 22 is image data of a color chart represented by an ink amount set of each single ink color. The test pattern data 22 represents patterns each formed by changing the ink amount in several stages from a state in which the ink amount is small to a state in which the ink amount is dense. Each pattern is associated with the ink amount of each single color, and is used as a color sample of the single ink color.

The input/output interface 30 sends image data to be printed by the printing device 200, for example, the test pattern data 22 and the color chart data 23, and receives a color measuring result of the printed image printed on the first printing medium P and the second printing medium F from the printing device 200.

A2. Overall Flow of Color Prediction Model Creation Processing

Figure 2:
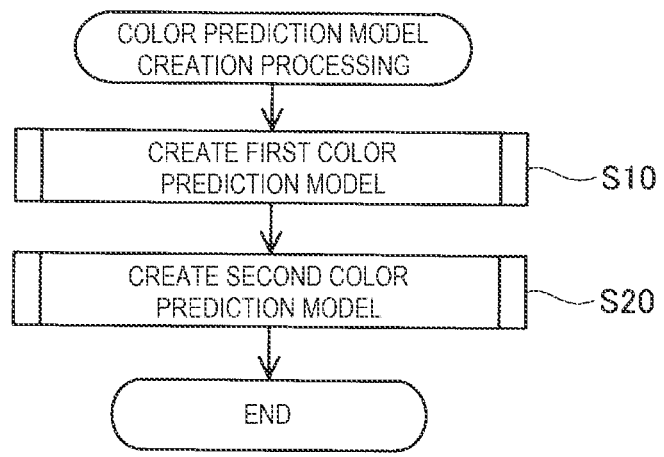
FIG. 2 is a flow chart showing a processing procedure of a color prediction model creation processing.

FIG. 2 is a flow chart showing a processing procedure of a color prediction model creation processing. First, an overall flow of the color prediction model creation processing is described. The color prediction model creation processing is started with selection of an operation menu for executing the color prediction model creation processing by a user in a display unit (not shown) provided in the color prediction model creation device 100. In step S10, the first color prediction model creation unit 11 creates the first color prediction model Md1. In step S20, the second color prediction model creation unit 12 creates the second color prediction model Md2. Next, steps will be described in detail.

A3. First Color Prediction Model Creation Processing

Figure 3:
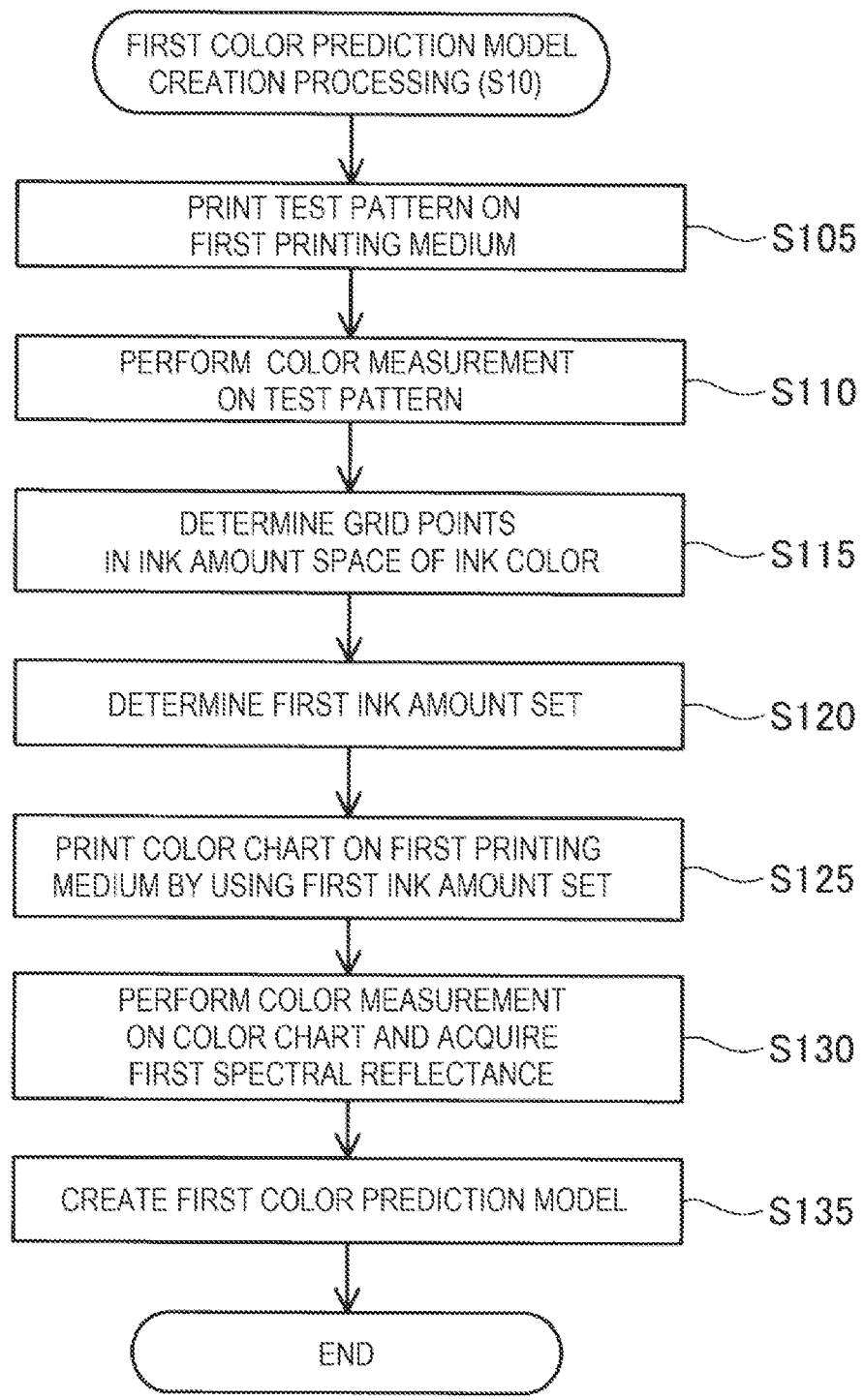
FIG. 3 is a flow chart showing a processing procedure of a first color prediction model creation processing.

FIG. 3 is a flow chart showing a processing procedure of a first color prediction model creation processing. In step S105, the first color prediction model creation unit 11 prints the test patterns on the first printing medium P. Specifically, the first color prediction model creation unit 11 instructs the control unit 210 of the printing device 200 to print the test patterns on the first printing medium P, and the control unit 210 controls the printing unit 220 to form a printed image of the test patterns on the first printing medium P according to specified printing conditions. The print conditions are input from the first color prediction model creation unit 11 via the input/output interface 30, and are, for example, conditions such as an ink amount set and print quality.

In step S110, the first color prediction model creation unit 11 performs color measurement on the test patterns. Specifically, the first color prediction model creation unit 11 instructs the control unit 210 of the printing device 200 to execute color measurement of the test patterns, and the control unit 210 controls the color measuring device 230 to measure a spectral reflectance of the printed image of the test patterns on the first printing medium P. The color measuring result is input to the color prediction model creation device 100 via the input/output interface 30.

In step S115, the first color prediction model creation unit 11 determines grid points in the ink amount space. Here, the "grid point" means coordinates specified by C, M, Y, and K components where the C, M, Y, and K components are coordinate axes in the ink amount space. An ink amount set is associated with the grid points, and the ink amount set can be represented by multidimensional coordinate values such as (C, M, Y, K)=(0,0,0,0). The position and number of the grid points can be set to any position and number, and spacings between adjacent grid points can be equal, and can be narrowed in a certain range and widened in a certain range. In the present embodiment, the ink amount set is determined by the total number combinations of the ink amounts of C, M, Y, and K, and is associated with the grid points. That is, the number of combinations of ink amounts is the number of all combinations of the ink amounts of C, M, Y, and K.

In step S120, the first color prediction model creation unit 11 determines a first ink amount set. Specifically, the first color prediction model creation unit 11 first acquires the ink amounts associated with each grid point determined in step S115. Next, the first color prediction model creation unit 11 extracts ink amounts that do not exceed an ink duty limit value from among the acquired ink amounts as the first ink amount set. The "ink duty limit value" is an upper limit value of a total amount of inks that can be ejected in a unit area of a print medium. Such a limitation is provided because that in an inkjet printer, if a large amount of inks is ejected into a unit area of a print medium, ink bleeding occurs and suitable color expression cannot be performed. The ink duty limit value differs depending on the printing conditions such as the printing medium and the type of inks. Next, the first color prediction model creation unit 11 creates color patches as a color sample actually printed with the first ink amount set, and stores the color patches in the storage unit 20 as the color chart data 23.

In step S125, the first color prediction model creation unit 11 prints the color chart on the first printing medium P by using the first ink amount set. Specifically, the first color prediction model creation unit 11 sends the first ink amount set and the color chart data 23 to the printing device 200 via the input/output interface 30, and the control unit 210 of the printing device 200 controls the printing unit 220 to form the printed image of the color chart on the first printing medium P.

In step S130, the first color prediction model creation unit 11 performs color measurement on the color chart and acquires a first spectral reflectance. Step S130 is executed by a similar procedure as in the above-mentioned step S110. Specifically, the control unit 210 of the printing device 200 controls the color measuring device 230 to measure a spectral reflectance of the printed image of the color chart formed on the first printing medium P, and inputs the color measuring result into the color prediction model creation device 100 as the first spectral reflectance. As a result, the first color prediction model creation unit 11 acquires a correspondence relationship between the first ink amount set and the first spectral reflectance.

In step S135, the first color prediction model creation unit 11 creates the first color prediction model Md1. Specifically, the first color prediction model creation unit 11 sets the first ink amount set and the first spectral reflectance as learning data and creates the first color prediction model Md1. An algorithm for the learning is not particularly limited, and known learning algorithms can be adopted. The created first color prediction model Md1 is stored in the storage unit 20. After the execution of step S135, the first color prediction model creation processing is completed, and a second color prediction model creation processing is executed.

A4. Second Color Prediction Model Creation Processing

Figure 4:
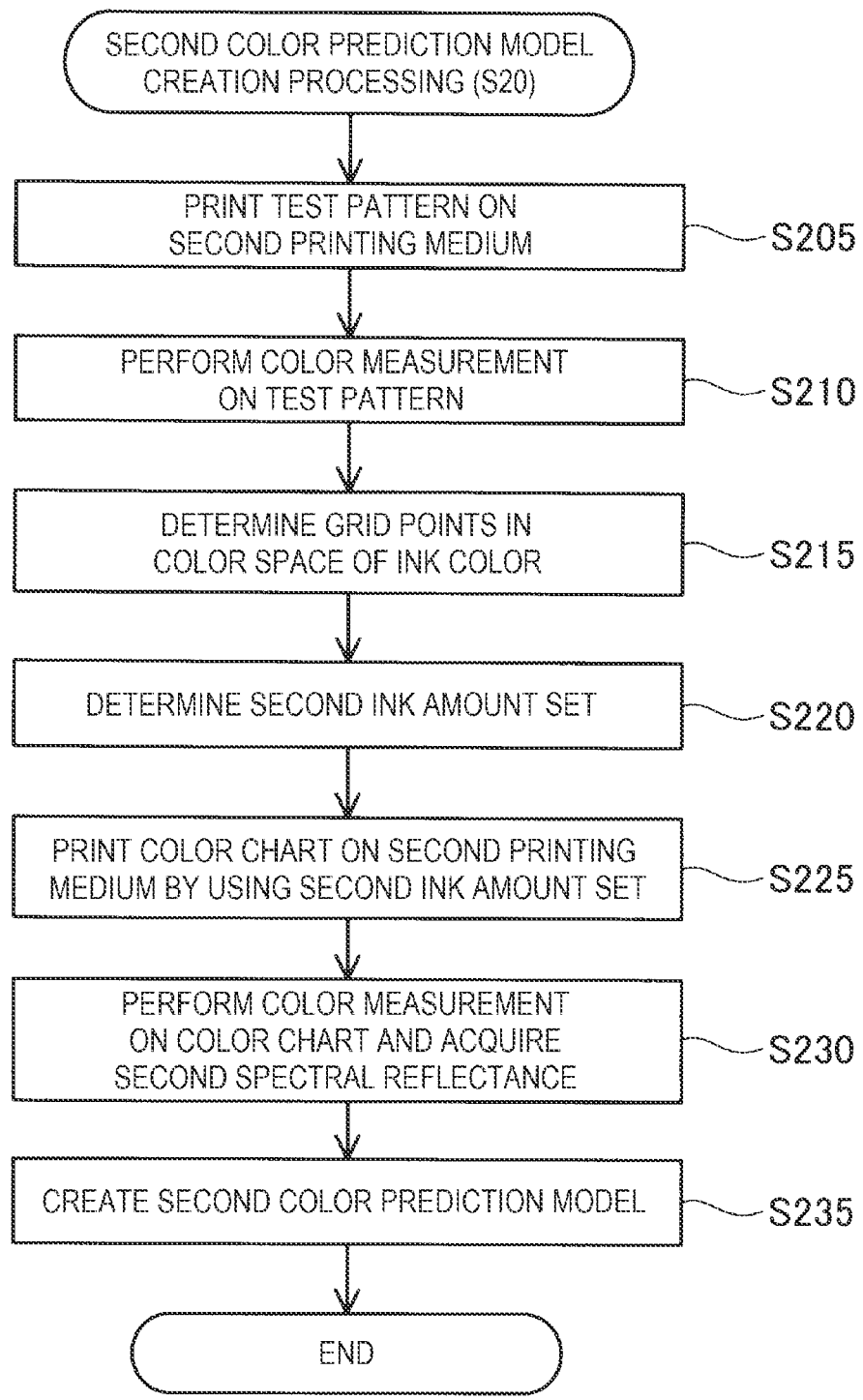
FIG. 4 is a flow chart showing a processing procedure of a second color prediction model creation processing.

FIG. 4 is a flow chart showing a processing procedure of the second color prediction model creation processing. In step S205, the second color prediction model creation unit 12 prints the test patterns on the second printing medium F. In step S205, different from the above-mentioned step S105, the print target of the test patterns is the second print medium F. Therefore, the control unit 210 of the printing device 200 first controls the printing unit 220 to print the test patterns on the first printing medium P by a similar procedure as in the above-mentioned step S105, and next, controls the thermal transfer unit 240 to sublimation transfer the printed image of the test patterns printed on the first print medium P to the second printing medium F to form a printed image of the test patterns on the second printing medium F.

In step S210, the second color prediction model creation unit 12 performs color measurement on the test pattern. Step S210 is executed by a similar procedure as in the above-mentioned step S110. That is, the control unit 210 of the printing device 200 controls the color measuring device 230 to measure the spectral reflectance of the printed image of the test pattern formed on the second printing medium F, and input the color measurement result to the color prediction model creation device 100 via the input/output interface 30.

In step S215, the second color prediction model creation unit 12 determines grid points in a color space of the ink colors. Specifically, similar to the above-mentioned step S115, the second color prediction model creation unit 12 determines an ink amount set about the total number for combinations of ink amounts of C, M, Y, and K, and associates the ink amounts with the grid points. That is, the number of combinations of ink amounts is the number of all combinations of each ink amount of C, M, Y, and K.

In step S220, the second color prediction model creation unit 12 determines a second ink amount set. Specifically, similar to the above-mentioned step S120, the second color prediction model creation unit 12 acquires the ink amounts associated with the grid points determined in step S215, extracts the ink amounts that do not exceed the ink duty limit value, selects combinations that meet the specified conditions, and associates the ink amount set for the selected combinations with the grid points. The specified conditions mean combinations of ink amounts of colors that require more accuracy in color reproduction for printing results, such as achromatic colors, single colors, and colors having high brightness. Therefore, the number of combinations of the ink amounts when creating the second color prediction model Md2 is smaller than the number of combinations of the ink amounts when creating the first color prediction model Md1.

In step S225, the second color prediction model creation unit 12 prints the color chart on the second printing medium F by using the second ink amount set. In step S225, different from the above-mentioned step S215, the print target of the color chart is the second print medium F. Therefore, the control unit 210 of the printing device 200 first controls the printing unit 220 to print the color chart on the first printing medium P, and next, controls the thermal transfer unit 240 to sublimation transfer the printed image of the color chart printed on the first print medium P to the second printing medium F to form a printed image of the color chart on the second printing medium F.

In step S230, the second color prediction model creation unit 12 performs color measurement on the color chart and acquires a second spectral reflectance. Step S230 is executed by a similar procedure to that in the above-mentioned step S210. As described above, the number of ink amount combinations in the second ink amount set is less than the number of ink amount combinations in the first ink amount set, that is, the total number of the ink amount combinations of C, M, Y, and K, and thereby, compared with the case where the first color prediction model Md1 is created, the number of color measurements of the color chart, or more accurately, the color patches, is reduced. According to an execution of step S230, the second color prediction model creation unit 12 acquires a correspondence relationship between the second ink amount set and the second spectral reflectance.

In step S235, the second color prediction model creation unit 12 creates the second color prediction model Md2. Specifically, the second color prediction model creation unit 12 creates the second color prediction model Md2 by learning using the second ink amount set determined in the above-mentioned step S220, the second spectral reflectance acquired in the above-mentioned step S230 and the first color prediction model Md1. In the present embodiment, the learning in step S235 is transfer learning. By executing the transfer learning using the learned first color prediction model Md1, the learning result at the time of creating the first color prediction model Md1 can be used, and thereby, even when the number of color measurement data of the color patches is small, the second color prediction model Md2 can be created with high accuracy. The created second color prediction model Md2 is stored in the storage unit 20. After the execution of step S235, the second color prediction model creation processing is completed.

A5. Color Conversion Table Creation Processing

Figure 5:
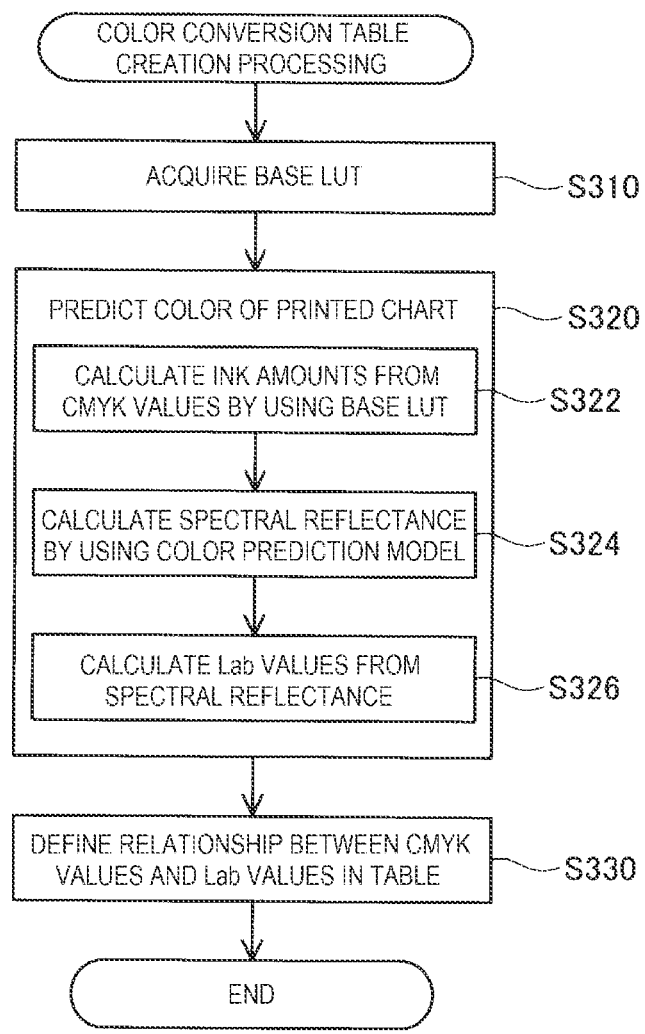
FIG. 5 is a flow chart showing a processing procedure of a color conversion table creation processing.

FIG. 5 is a flow chart showing a processing procedure of the color conversion table creation processing. The color conversion table creation processing is started by executing a color conversion table creation program (not shown) stored in advance in the storage unit 20. In step S310, the color conversion table creation unit 13 acquires a base LUT. The base LUT is a table for converting the CMYK values, which are color values of the CMYK color system depending on the printing device 200, into ink amounts. In the present embodiment, the base LUT is created by using the second color prediction model Md2. Specifically, the base LUT is created based on the ink duty limit value, other parameters, and the color values predicted by the second color prediction model Md2. As the base LUT, when a base LUT is already created, such a base LUT may be used.

In step S320, the color conversion table creation unit 13 predicts a color of a printed chart. The printed chart means, for example, a color chart represented by the CMYK values such as an ECI2002 chart. As the printed chart, a dedicated color chart provided by a manufacturer of the printing device 200 may be used. In the present embodiment, a procedure for predicting colors of the printed chart using the color prediction model will be described. Specifically, in step S322, the color conversion table creation unit 13 calculates the ink amounts from the CMYK values by using the base LUT. In step S324, the color conversion table creation unit 13 calculates the spectral reflectance from the ink amounts calculated by using the second color prediction model Md2. In step S326, the color conversion table creation unit 13 calculates the Lab values from the spectral reflectance. In step S320, the colors of the printed chart may be predicted without using the color prediction model. Specifically, the Lab values of the printed chart may be acquired by printing and performing color measurement on the printed chart.

In step S330, the color conversion table creation unit 13 defines a relationship between the CMYK values and the Lab values in a table, and thereby creates the color conversion table.

According to the first embodiment described above, the first spectral reflectance, which is a color measurement value of the color chart printed on the first print medium P, is acquired by using the first ink amount set, the first color prediction model Md1 is created by learning the correspondence relationship between the first ink amount set and the first spectral reflectance, the second spectral reflectance, which is a color measurement value of the color chart printed on the second print medium F, is acquired by using the second ink amount set in which the number of ink amount combinations is smaller than that of the first ink amount set, and the second color prediction model Md2 is created by learning using the second ink amount set, the second spectral reflectance, and the first color prediction model Md1. Therefore, effort and time required for performing printing and color measurement on the color chart for the second print medium F can be reduced. By learning using the learned first color prediction model Md1, even when the number of learning data is small, the second color prediction model Md2 can be created with higher accuracy.

Since the learning when creating the second color prediction model Md2 is a transfer learning, the second color prediction model Md2 can be created accurately even when the number of data of the second ink amount set and the second spectral reflectance, which are the learning data, is reduced. Since the second color prediction model Md2 is used to create a color conversion table for converting the color values of the CIE-Lab color system into the color values of the CMYK color system, it is not necessary to print and perform color measurement on the color chart for the second print medium F at the time of creating the color conversion table. Therefore, time for obtaining the printed matter of the second print medium F and time and effort for obtaining the color measuring result of the second print medium F at the time of creating the color conversion table can be reduced.

B. Second Embodiment

Figure 6:
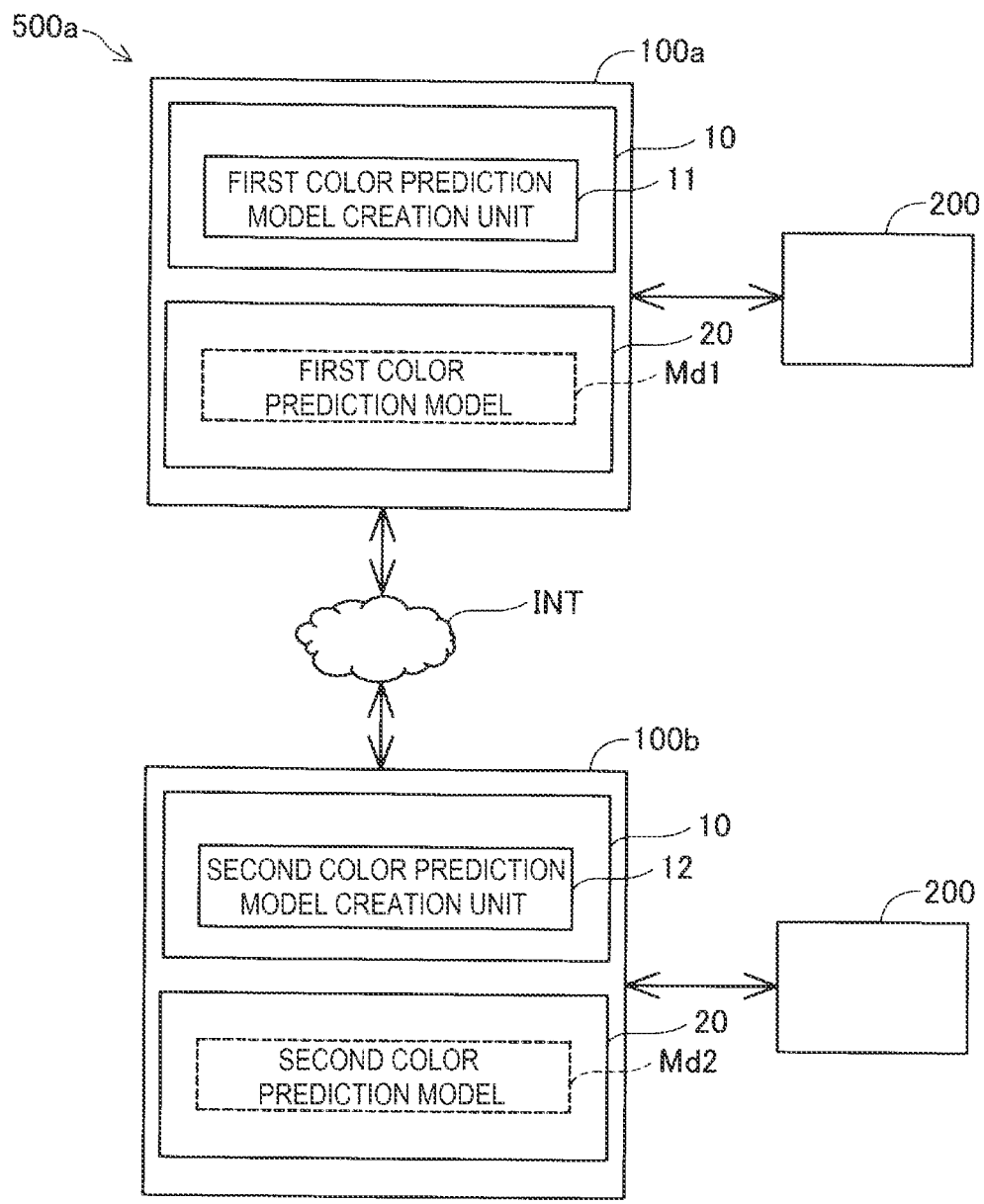
FIG. 6 is a block diagram showing a schematic configuration of a color prediction model creation system according to a second embodiment.

FIG. 6 is a block diagram showing a schematic configuration of a color prediction model creation system 500a according to the second embodiment. The color prediction model creation system 500a includes a server 100a including the first color prediction model creation unit 11 and a client 100b including the second color prediction model creation unit 12. The server 100a is arranged at a development site of the manufacturer of the printing device 200, and the client 100b is arranged at a using place of a user of the printing device 200. The server 100a and the client 100b are connected to each other by a network such as the Internet INT or a LAN. The printing device 200 is connected to both the server 100a and the client 100b.

In the second embodiment, the first color prediction model Md1 and the second color prediction model Md2 are created in different environments. Specifically, the first color prediction model Md1 is created in the server 100a, and the second color prediction model Md2 is created in the client 100b. The client 100b acquires the first color prediction model Md1 stored in the storage unit 20 of the server 100a from the server 100a, and creates the second color prediction model Md2 by learning using the second ink amount set determined in the client 100b, the second spectral reflectance acquired in the client 100b, and the acquired first color prediction model Md1. The created second color prediction model Md2 is stored in the storage unit 20 of the client 100b. In this manner, by omitting the creation of the first color prediction model Md1 on the client 100b, a total time required for creating the color prediction model on the client 100b can be reduced. As long as the server 100a stores the first color prediction model Md1 in the storage unit 20, the first color prediction model Md1 does not have to be created in the server 100a.

The above-described second embodiment includes the server 100a in which the first color prediction model Md1 is stored, and the client 100b that acquires the first color prediction model Md1 from the server, and creates the second color prediction model Md2 by learning using the second ink amount set determined in the client 100b, the second spectral reflectance acquired in the client 100b, and the acquired first color prediction model Md1. Therefore, compared with a configuration in which the second color prediction model Md2 is created after the creation of the first color prediction model Md1 in the client 100b, the time and effort required to create the color prediction model can be reduced. Therefore, when a plurality of clients 100b are connected to the server 100a, the time and effort required to create the color prediction model for each client 100b can be reduced, and convenience of the user of the printing device 200 can be improved.

C. Other Embodiments (1) In the above embodiments, the printing device 200 is a sublimation transfer type inkjet printer, whereas the printing device 200 may also be an inkjet printer, or an inkjet printer for textile printing.

(2) In the above first embodiment, the color prediction model creation device 100 may not include the color conversion table creation unit 13.

(3) In the above second embodiment, for the client 100b, the created second color prediction model Md2 is stored in the storage unit 20 of the client 100b, whereas the second color prediction model Md2 may also be stored in the storage unit 20 of the server 100a. The client 100b includes the second color prediction model creation unit 12, whereas the server 100a may also include the second color prediction model creation unit 12.

Figure 7:
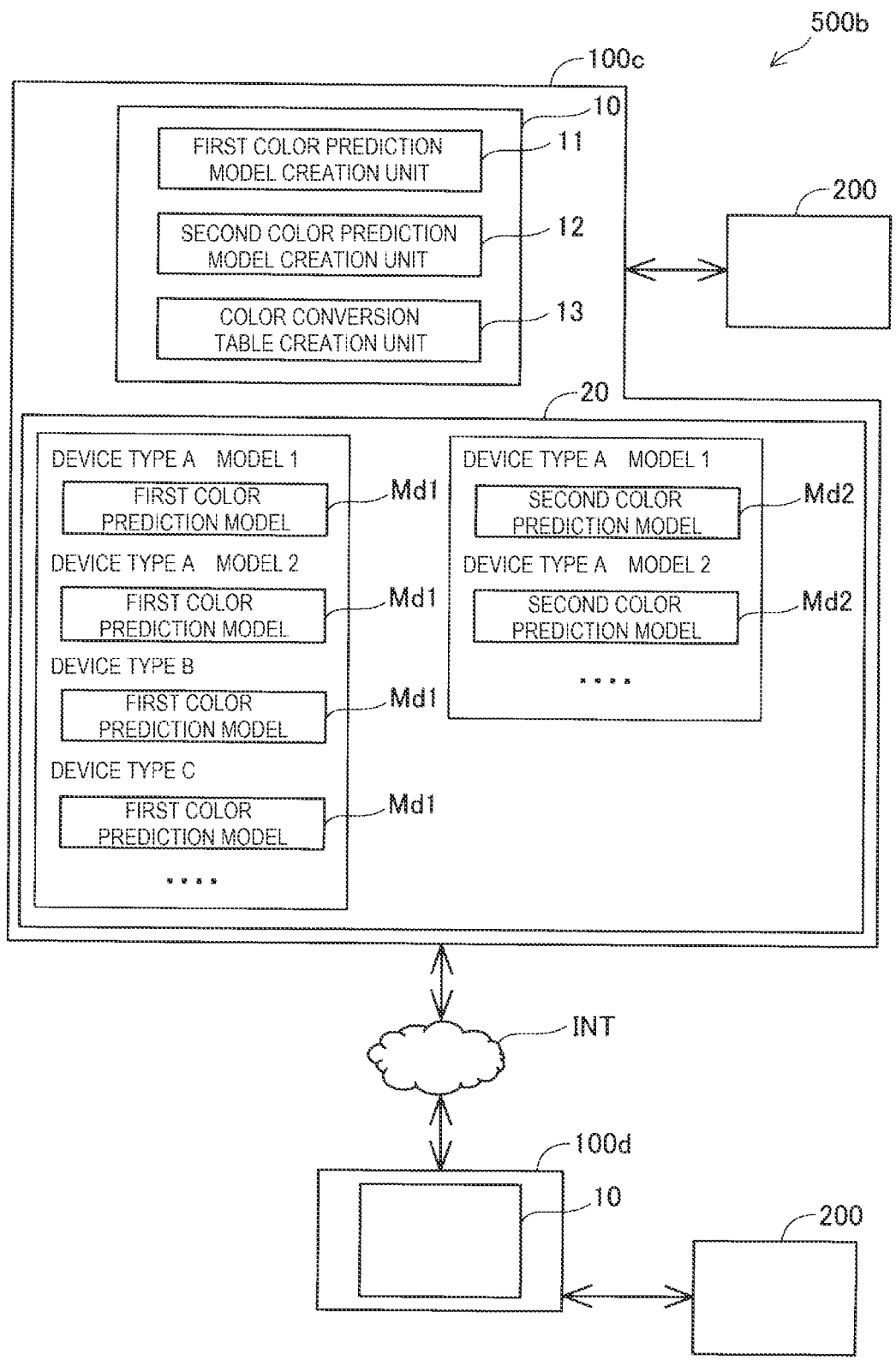
FIG. 7 is a block diagram showing a schematic configuration of a color prediction model creation system as another example.

FIG. 7 is a block diagram showing a schematic configuration of the color prediction model creation system as another example. A color prediction model creation system 500b shown in FIG. 7 includes a server 100c including the first color prediction model creation unit 11, the second color prediction model creation unit 12 and the color conversion table creation unit 13, and a client 100d. The storage unit 20 of the server 100c stores the first color prediction model Md1 and the second color prediction model Md2 created for each type and model of the printing device. In such a configuration, the client 100d can acquire the color prediction models Md1 and Md2 of a desired device type from the server 100c. Therefore, it is not necessary to execute the color prediction model creation processing and the color conversion table creation processing on the client 100d, and therefore a processing load on the client 100d can be reduced. In the configuration shown in FIG. 7, when the client 100d includes the color conversion table creation unit 13, the client 100d may acquire the second color prediction model Md2 from the server 100c and acquire the color values (Lab values) by using the acquired second color prediction model Md2, and may acquire only required color values by using the second color prediction model Md2 in the server 100c without acquiring the second color prediction model Md2 from the server 100c.

(4) In the above other embodiment 3, the storage unit 20 in the server 100a may also store a plurality of the second color prediction models Md2. In this case, for example, in a configuration in which a single client 100b is connected to the server 100a, as shown in FIG. 6, the plurality of second color prediction models Md2 created in the client 100b may also be stored in the storage unit 20 in the server 100a. For example, in a configuration in which a plurality of clients 100b are connected to the server 100a, the second color prediction models Md2 created in the clients 100b may also be stored in the storage unit 20 in the server 100a. At this time, the second color prediction models Md2 may be stored in association with the creation date and time, the ink colors, information of the second ink amount set, and the like.

(5) In the above other embodiment 4, the client 100b acquires the second color prediction model Md2 stored in the storage unit 20 of the server 100a, and creates (updates) the second color prediction model by learning using the acquired second color prediction model Md2. When acquiring the second color prediction model Md2 from the server 100a, the client 100b may acquire the second color prediction model Md2 by selecting a second color prediction models Md2 created in an environment similar to an environment of the client 100b which is, for example, a combination of the ink colors used in the printing device 200 and the ink amounts of the second ink amount set, among the plurality of the second color prediction models Md2. In this way, an accuracy of the second color prediction model Md2 created (updated) by the client 100b can be further improved. When it is desired to improve a color prediction accuracy of a specific color gamut, the client 100b may select a second color prediction model Md2 that includes more color prediction data of such a color gamut.

(6) In the above second embodiment and other embodiments 3, 4, and 5, at least one of the sever 100a and the client 100b may include the color conversion table creation unit 13. In a configuration in which the server 100a includes the color conversion table creation unit 13, the configuration may be such that the client 100b instructs the server 100a to create the color conversion table, and the configuration may be such that the client 100b acquires the color conversion table created in the server 100a.

(7) In the above embodiments, the learning when the second color prediction model Md2 is created is a transfer learning, but may also be, instead of the transfer learning, a fine tuning, or a combined learning of the transfer learning and the fine tuning. In the configuration for the combined learning, the number of learning data can be further reduced and the second color prediction model Md2 can be created with high accuracy as compared with a configuration in which only the transfer learning is performed or the configuration in which only the fine tuning is performed.

(8) In the above embodiments, the printing device 200 prints using inks of four color including cyan, magenta, yellow, and black, whereas in addition to these, other inks such as light cyan, light magenta, light black, orange, green, and violet inks may also be used for printing.

D. Other Aspects (1) According to a first aspect of the present disclosure, a color prediction model creation device configured to create a color prediction model for predicting color values of a device-independent color system from an ink amount set that is combinations of ink amounts for inks used in printing is provided. The color prediction model creation device includes: a first color prediction model creation unit configured to acquire a first spectral reflectance that is a color measurement value of a color chart printed on a first printing medium by using a predetermined first ink amount set, and create a first color prediction model that is the color prediction model used for the first printing medium by learning a correspondence relationship between the first ink amount set and the first spectral reflectance; and a second color prediction model creation unit configured to acquire a second spectral reflectance that is a color measurement value of a color chart printed on a second printing medium that is different from the first printing medium by using a predetermined second ink amount set having a smaller number of combinations than that of the first ink amount set, and create a second color prediction model that is the color prediction model used for the second printing medium by learning using the second ink amount set, the second spectral reflectance and the first color prediction model.

According to the color prediction model creation device according to this aspect, the first spectral reflectance, which is the color measurement value of the color chart printed on the first print medium, is acquired by using the first ink amount set, the first color prediction model is created by learning the correspondence relationship between the first ink amount set and the first spectral reflectance, the second spectral reflectance, which is the color measurement value of the color chart printed on the second print medium, is acquired by using the second ink amount set in which the number of ink amount combinations is smaller than that of the first ink amount set, and the second color prediction model is created by learning using the second ink amount set, the second spectral reflectance, and the first color prediction model. Therefore, effort and time required for performing printing and color measurement on the color chart for the second print medium can be reduced. By learning using the learned first color prediction model, even when the number of learning data is small, the second color prediction model can be created with higher accuracy.

(2) In the color prediction model creation device according to the above aspect, the learning of the second color prediction model creation unit may be any one of a transfer learning, a fine tuning, and a combined learning of the transfer learning and the fine tuning.

According to the color prediction model creation device according to this aspect, the learning in the second color prediction model creation unit is any one of the transfer learning, the fine tuning, and the combined learning of the transfer learning and the fine tuning. Therefore, the second color prediction model can be created accurately even when the number of data of the second ink amount set and the second spectral reflectance, which are the learning data, is reduced.

(3) In the color prediction model creation device according to the above aspect, the color prediction model creation device may further include: a color conversion table creation unit configured to create, using the second color prediction model, a color conversion table for a conversion from the color values in the device-independent color system to color values in a CMYK color system.

According to the color prediction model creation device according to this aspect, the second color prediction model is used to create the color conversion table for converting the color values of the device-independent color system into the color values of the CMYK color system. Therefore, it is not necessary to print and perform color measurement on the color chart for the second print medium at the time of creating the color conversion table. Therefore, the time for obtaining the printed matter of the second print medium and time and the effort for obtaining the color measuring result of the second print medium at the time of creating the color conversion table can be reduced.

(4) According to a second aspect of the present disclosure, a color prediction model creation system configured to create a color prediction model for predicting color values of a device-independent color system from an ink amount set that is combinations of ink amounts for inks used in printing is provided. The color prediction model creation system includes: a server provided with a storage unit in which a first color prediction model, which is the color prediction model used for a first printing medium, is stored; and a client configured to input a spectral reflectance that is a color measurement value of the color chart printed on a second printing medium, which is different from the first printing medium, by using a predetermined ink amount set, wherein the color prediction model creation system is configured to create a second color prediction model that is the color prediction model used for the second printing medium by learning using the ink amount set, the spectral reflectance, and the first color prediction model.

The color prediction model creation system according to the above aspect includes the server in which the first color prediction model is stored, and the client in which the spectral reflectance that is the color measurement value of the color chart printed on the second printing medium by using a predetermined ink amount set, and the second color prediction model, which is the color prediction model used for the second printing medium, is created by the learning using the ink amount set, the spectral reflectance, and the first color prediction model. Therefore, the time and effort required for creating the color prediction model is reduced compared with the configuration in which the second color prediction model is created after the creation of the first color prediction model in the client.

(5) In the color prediction model creation system according to the above aspect, the color prediction model creation system may be configured to store the created second color prediction model in the storage unit in the server.

According to the color prediction model creation system according to this aspect, since the created second color prediction model is stored in the storage unit of the server, the second color prediction model can be integrally managed on the server.

(6) In the color prediction model creation system according to the above aspect, the storage unit in the server may store a plurality of second color prediction models, and the color prediction model creation system may be configured to: select one second color prediction model among the plurality of second color prediction models, and create a second color prediction model that is the color prediction model used for the second printing medium by learning using the ink amount set, the spectral reflectance, and the one second color prediction model.

According to the color prediction model creation system according to this aspect, the storage unit of the server stores the plurality of the second color prediction models, and the color prediction model creation system selects one second color prediction model among the plurality of the second color prediction models, and creates the second color prediction model by learning using the ink amount set, the spectral reflectance, and the one second color prediction model. Therefore, a more accurate second color prediction model can be created based on a desired second color prediction model.

(7) In the color prediction model creation system according to the above aspect, any one of the server and the client, using the second color prediction models, further may include a color conversion table creation unit configured to create a color conversion table for a conversion from the color values in the device-independent color system to color values in a CMYK color system.

According to the color prediction model creation system according to this aspect, any one of the server and the client, using the second color prediction models, further includes the color conversion table creation unit that creates the color conversion table for the conversion from the color values in the device-independent color system to the color values in the CMYK color system. Therefore, it is not necessary for the color conversion table creation unit to be included in both environments of the server and the client. Therefore, a device configuration of the server or the client can be simplified.

(8) According to a third aspect of the present disclosure, a color prediction model creation method for creating a color prediction model for predicting color values of a device-independent color system from an ink amount set that is combinations of ink amounts for inks used in printing is provided. The method includes: a first model creation step of acquiring a first spectral reflectance that is a color measurement value of a color chart printed on a first printing medium by using a predetermined first ink amount set, and creating a first color prediction model that is the color prediction model used for the first printing medium by learning a correspondence relationship between the first ink amount set and the first spectral reflectance; and a second model creation step of acquiring a second spectral reflectance that is a color measurement value of a color chart printed on a second printing medium that is different from the first printing medium by using a predetermined second ink amount set having a smaller number of combinations of the ink amounts than that of the first ink amount set, and creating a second color prediction model that is the color prediction model used for the second printing medium by learning using the second ink amount set, the second spectral reflectance and the first color prediction model.

(9) In the embodiments described above, some of the configurations implemented by hardware may be replaced with software, or conversely, some of the configurations implemented by software may be replaced with hardware. In a case where some or all of the functions of the present disclosure are implemented by software, the software (computer program) can be provided in a form stored in a computer-readable recording medium. Examples of such a "computer-readable recording medium" include not only a portable recording medium such as a flexible disk and a CD-ROM, but an internal storage device in a computer such as various types of RAM or ROM, and an external storage device fixed to a computer such as a hard disk. That is, the "computer-readable recording medium" has a broad meaning and includes any recording medium in which data can be fixed rather than be temporarily stored.

The present disclosure is not limited to the embodiments described above, and may be implemented by various configurations without departing from the scope of the present disclosure. For example, in order to solve some or all of the problems described above, or to achieve some or all of the effects described above, technical characteristics in the embodiments corresponding to the technical characteristics in each embodiment described in the summary of the disclosure can be replaced or combined as appropriate. If the technical characteristics are not described as essential in the present description, they can be deleted as appropriate.

What is claimed is:

1. A color prediction model creation device configured to create a color prediction model for predicting color values of a device-independent color system from an ink amount set that is combinations of ink amounts for inks used in printing, the color prediction model creation device comprising:

a processor configured to acquire a first spectral reflectance that is a color measurement value of a color chart printed on a first printing medium by using a predetermined first ink amount set, and create a first color prediction model that is the color prediction model used for the first printing medium by learning a correspondence relationship between the first ink amount set and the first spectral reflectance, the processor being further configured to acquire a second spectral reflectance that is a color measurement value of a color chart printed on a second printing medium that is different from the first printing medium by using a predetermined second ink amount set having a smaller number of combinations than that of the first ink amount set, and create a second color prediction model that is the color prediction model used for the second printing medium by learning using the second ink amount set, the second spectral reflectance and the first color prediction model.

2. The color prediction model creation device according to claim 1, wherein the learning to create the second color prediction model is any one of a transfer learning, a fine tuning, and a combined learning of the transfer learning and the fine tuning.

3. The color prediction model creation device according to claim 1, wherein the processor is further configured to create, using the second color prediction model, a color conversion table for a conversion from the color values in the device-independent color system to color values in a CMYK color system.

4. A color prediction model creation system configured to create a color prediction model for predicting color values of a device-independent color system from an ink amount set that is combinations of ink amounts for inks used in printing, comprising:

a server computer provided with a storage unit in which a first color prediction model, which is the color prediction model used for a first printing medium, is stored; and a client computer configured to input a spectral reflectance that is a color measurement value of the color chart printed on a second printing medium, which is different from the first printing medium, by using a predetermined ink amount set, wherein the color prediction model creation system is configured to create a second color prediction model that is the color prediction model used for the second printing medium by learning using the ink amount set, the spectral reflectance, and the first color prediction model.

5. The color prediction model creation system according to claim 4, wherein the color prediction model creation system is configured to store the created second color prediction model in the storage unit in the server computer.

6. The color prediction model creation system according to claim 5, wherein the storage unit in the server computer stores a plurality of second color prediction models, and the color prediction model creation system is configured to:

select one second color prediction model among the plurality of second color prediction models, and create a second color prediction model that is the color prediction model used for the second printing medium by learning using the ink amount set, the spectral reflectance, and the one second color prediction model.

7. The color prediction model creation system according to claim 4, wherein any one of the server computer and the client computer further includes a processor configured to create a color conversion table for a conversion from the color values in the device-independent color system to color values in a CMYK color system.

8. A color prediction model creation method for creating a color prediction model for predicting color values of a device-independent color system from an ink amount set that is combinations of ink amounts for inks used in printing, the color prediction model creation method comprising:

a first model creation step of acquiring a first spectral reflectance that is a color measurement value of a color chart printed on a first printing medium by using a predetermined first ink amount set, and creating a first color prediction model that is the color prediction model used for the first printing medium by learning a correspondence relationship between the first ink amount set and the first spectral reflectance; and a second model creation step of acquiring a second spectral reflectance that is a color measurement value of a color chart printed on a second printing medium that is different from the first printing medium by using a predetermined second ink amount set having a smaller number of combinations than that of the first ink amount set, and creating a second color prediction model that is the color prediction model used for the second printing medium by learning using the second ink amount set, the second spectral reflectance and the first color prediction model.

* * * * *